United States Patent [19]

Hrovat et al.

[11] Patent Number: 5,735,362

[45] Date of Patent: Apr. 7, 1998

[54] TRACTION CONTROL FOR MOVING A VEHICLE FROM DEEP SNOW

[75] Inventors: Davorin D. Hrovat; Minh N. Tran, both of Dearborn; John L. Yester, Bloomfield, all of Mich.

[73] Assignee: Ford Global Technologies, Inc., Dearborn, Mich.

[21] Appl. No.: 610,918

[22] Filed: Mar. 5, 1996

[51] Int. Cl.$^6$ .................................................. B60K 15/00
[52] U.S. Cl. ............................................................. 180/197
[58] Field of Search .................. 180/197; 364/426.027, 364/426.029, 426.033, 426.036

[56] References Cited

U.S. PATENT DOCUMENTS

| | | | |
|---|---|---|---|
| 4,884,651 | 12/1989 | Harada et al. | 180/197 |
| 5,090,510 | 2/1992 | Watanabe et al. | 180/197 |
| 5,090,511 | 2/1992 | Kabasin | 180/197 |
| 5,330,027 | 7/1994 | Glover | 180/197 |
| 5,394,329 | 2/1995 | Bridgens | 180/197 |
| 5,515,279 | 5/1996 | Hrovat et al. | 364/426.027 |

FOREIGN PATENT DOCUMENTS

| | | |
|---|---|---|
| 0511473 A2 | 11/1992 | European Pat. Off. . |
| 4122345 A1 | 1/1992 | Germany . |

*Primary Examiner*—Paul N. Dickson
*Attorney, Agent, or Firm*—Peter Abolins

[57] ABSTRACT

A method of controlling the driving wheels of a vehicle having an internal combustion engine wherein it is determined if a vehicle stuck or not and then, if stuck, the maximum permissible amount of wheel slip is increased with the intent of removing loose material, such as snow, underneath the tires. If the vehicle remains stuck and wheel slip continues, the amount of driving power and torque to the wheels is then reduced. Conversely, if the spin is not present at the subsequent gas pedal application (tip-in), and the vehicle is still stuck, the wheel torque limit is increased.

2 Claims, 3 Drawing Sheets

TRACTION CONTROL FOR MOVING A VEHICLE FROM DEEP SNOW

BACKGROUND OF THE INVENTION

1. Field of the Invention

This invention relates to electronic control of the driving wheels of a vehicle having an internal combustion engine.

2. Prior Art

Traction control of various types is known. For example, it is known to reduce the power applied to the driving wheels through various combinations of controlling engine operating parameters such as spark advance, fuel injection and throttle control. Braking may also be used to control driving wheel rotation.

Even though such control of the driving wheels is known, there still is a need to improve the performance of traction control in various operating environments. Conditions such as low speed and deep snow are addressed, in part, by this invention.

SUMMARY OF THE INVENTION

In accordance with an embodiment of this invention there is used an available preview of the surface friction conditions from increased slip targets to increase tire tractive forces up to a maximum possible at or near zero vehicle speeds, indicating a stuck vehicle. This invention is advantageous because there are increased chances for moving a vehicle from a snow bank, stuck in snow or similar stuck condition.

DETAILED DESCRIPTION OF THE INVENTION

When trying to move a vehicle in deep snow the following traction control strategy in accordance with an embodiment of this invention is used.

During the first attempts to remove the vehicle, such as the first couple of tip-ins, identify that the vehicle is stuck by monitoring of non-driven wheels and then start increasing the slip target. The slip target is the amount of wheel slip of the driving wheels allowed before reducing driving power to the driving wheels. This will cause more wheel slip and in some cases this could be beneficial. For example, this may help remove the loose material, such as snow, underneath the tire and bring the tire in contact with firmer, hopefully higher-mu ground layer.

Figure 1A:
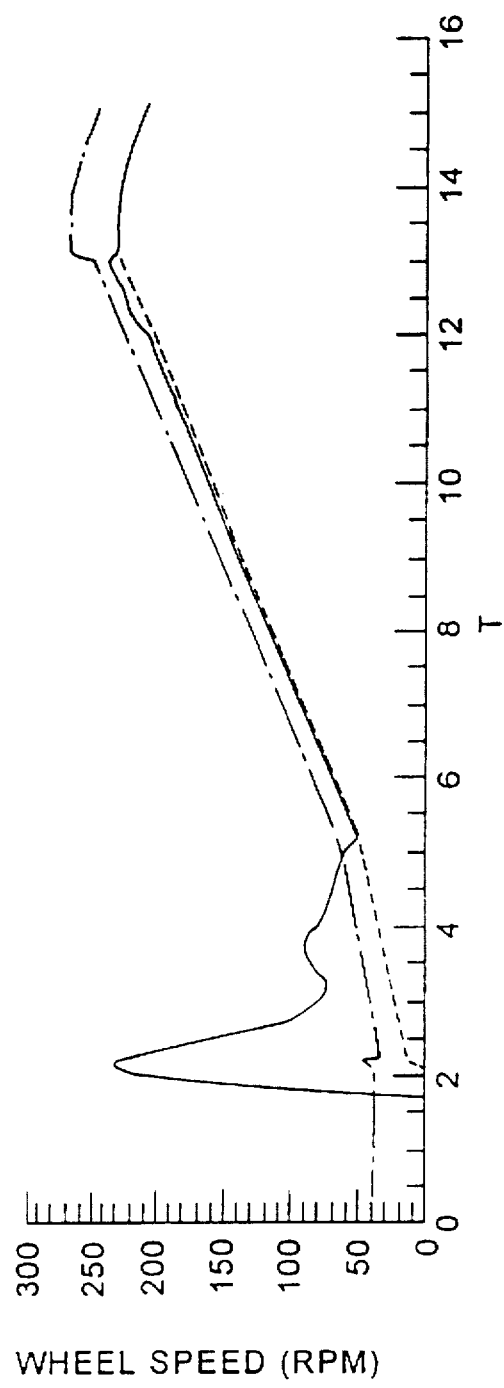
FIGS. 1A and 1B are graphic representations of wheel speed and torque during a spin on ice at or near zero vehicle speed indicating a stuck conditions.
Figure 1B:
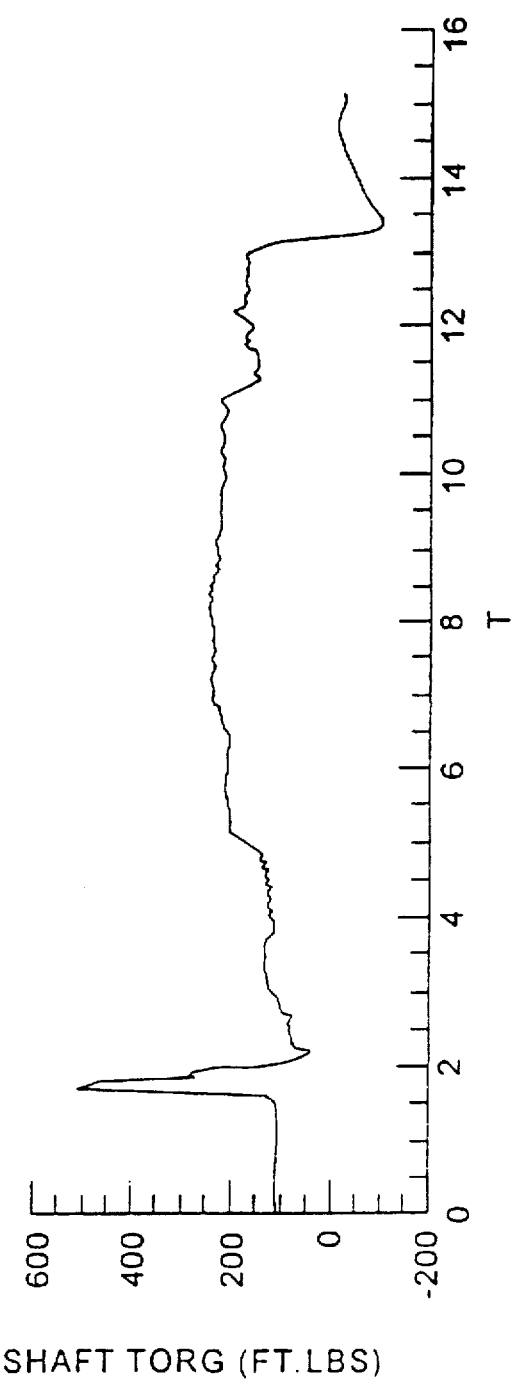

If the above approach does not cause the vehicle to move, then proceed with the approach based on "preview" of underlying surface which was provided by the above approach. Such an action has a potential to increase the tractive force up to 100% as shown in FIGS. 1A and 1B indicating of initial wheel spin and torque on ice.

Figure 2A:
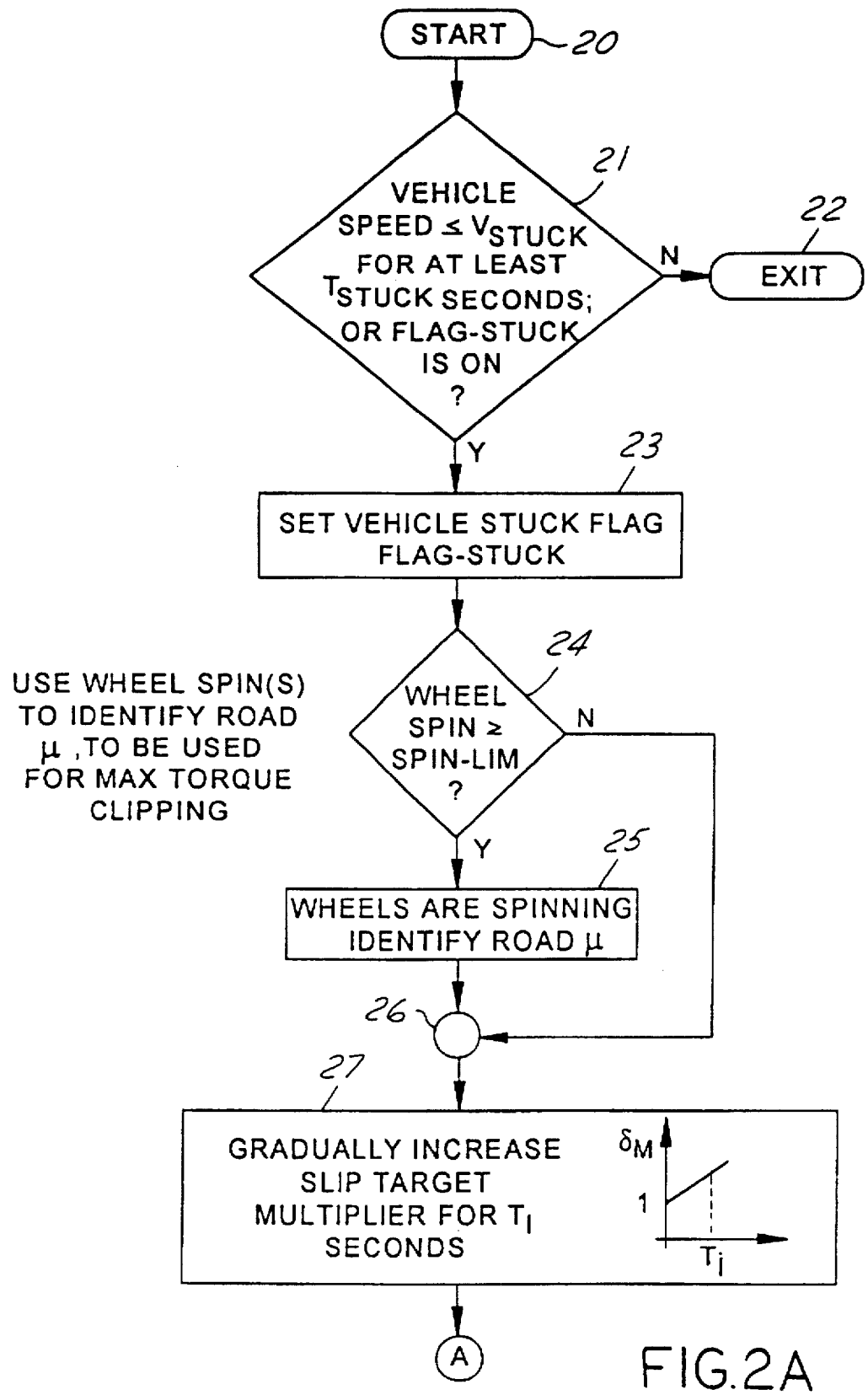
FIGS. 2A and 2B are a logic flow description of a traction control system in accordance with an embodiment of this invention.
Figure 2B:
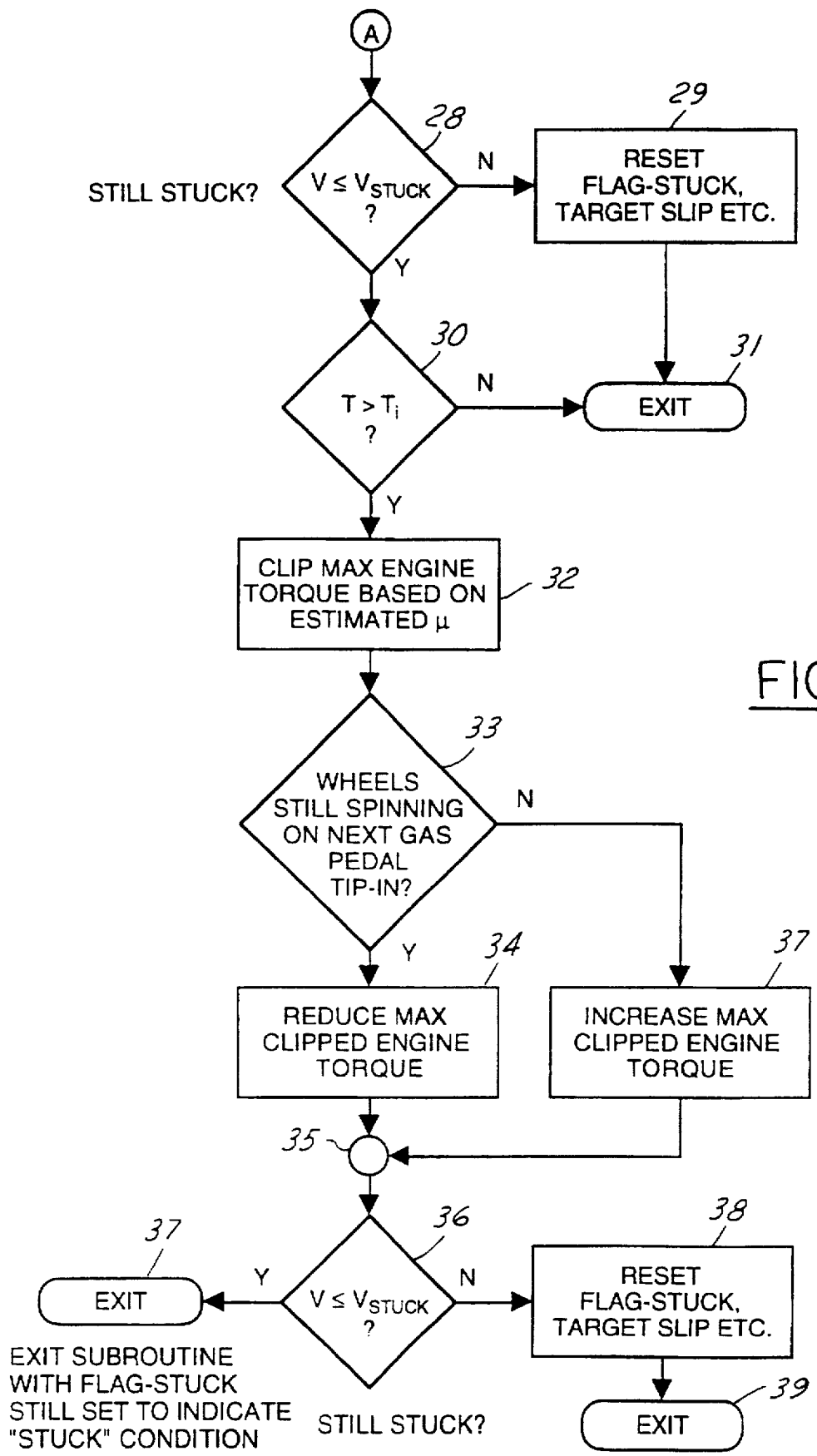

Referring to FIGS. 2A and 2B, logic flow starts at a block 20 and goes to a decision block 21 wherein it is asked if the vehicle speed is less than or equal to a stuck velocity for at least a predetermined number of seconds or if the stuck flag is on. If the answer is no, the logic flow goes to an exit block 22. If the answer is yes, logic flow goes to a block 23 wherein the vehicle stuck flag is set. Logic flow then goes to a decision block 24 wherein it is asked if wheel spin is greater than or equal to a limiting spin. The limiting spin is used to determine surface friction coefficients which are then stored for future use. The spin needs to be above such limiting value for the surface friction coefficient identification to be valid. If yes, logic flow goes to a block 25 wherein wheels are spinning, which facilitates identification of the road-mu. Logic flow then goes to a node 26 which then goes to a block 27 wherein there is gradually increased the slip target multiplier. If the answer in block 24 is no, logic flow goes to node 26 and block 27. Logic flow then goes to a block 28 in FIG. 2B wherein it is asked if the velocity is less than or equal to the stuck velocity. If the answer is no, the stuck flag is reset at a block 29. If the answer is yes, logic flow goes to a block 30 wherein it is asked if the time is greater than the predetermined time. If no, logic flow goes to an exit block 31. Logic flow from block 29 also goes to exit block 31.

If the answer in block 30 is yes, signifying that sufficient time has been spent in trying to move through an excessive wheel spin, the logic flow goes to a block 32 wherein the maximum engine torque based on estimated mu is clipped. Logic flow then goes to a decision block 33 wherein it is asked if the wheel is still spinning on the next gas pedal tip-in. If the answer is yes, logic flow goes to a block 34 wherein there is a reduced max clip engine torque. Logic flow then goes to a node 35 and then to a decision block 36. If at decision block 33 the answer was no, logic flow goes to a block 37 wherein there is an increased maximum clip engine torque. Logic flow from block 37 goes to node 35 and decision block 36. At decision block 36 it is asked if the vehicle speed is less than or equal to the stuck velocity, i.e. is the vehicle still in a stuck condition. If the answer is yes, logic flow goes to an exit block 37. If the answer is no, logic flow goes to a block 38 wherein there is reset the stuck flag and the target slip indicating that the vehicle is no more in a stuck condition. From block 38 logic flow goes to an exit block 39.

Various modifications and variations will no longer doubt occur to those skilled in the various arts to which this invention pertains. Such variations which basically rely on the teachings through which this disclosure has advanced the art are properly considered within the scope of this invention.

We claim:

1. A method of operating a traction control system for a vehicle with an internal combustion engine and a plurality of wheels, including the steps of:

establishing a predetermined amount of slip required for operating the traction control system to reduce power applied to the driving wheels;

determining the vehicle is stuck;

spinning the wheels to clear loose material;

increasing the magnitude of the predetermined amount of slip required for operating the traction control system to reduce power applied to the driving wheels; and reducing spinning of the wheels to drive the vehicle out of loose material.

2. A method of controlling traction of a vehicle with an internal combustion engine, a gas pedal, a plurality of wheels, said wheels having an adjustable wheel torque limit, including the steps of:

establishing a predetermined amount of permissible wheel slip target;

identifying a surface friction coefficient if wheel spin is greater than a predetermined amount of wheel spin and if the vehicle speed is less than a predetermined stuck speed;

increasing the wheel slip target based on the identified surface friction coefficient for permissible wheel slip for a predetermined amount of time;

determining if the vehicle is still stuck;

determining if a time duration since determining vehicle speed is greater than the predetermined amount of time;

reducing an amount of engine torque applied to the wheels based upon the determined road surface friction coefficient if the time duration is greater than the predetermined amount of time;

determining if the wheels are still spinning on a next gas pedal tip in;

if wheels are still spinning, reducing the amount of engine torque applied to the wheels because the wheel slip target was set too high and the engine torque applied to the wheels was too large resulting in excessive wheel spinning; and if wheels are not spinning, increasing the maximum allowable engine torque limit because the wheel slip target was set too low and the engine torque applied to the wheels was too small not alleviating the stuck condition.

\* \* \* \* \*